(12) United States Patent
Burgmeier et al.

(10) Patent No.: US 6,577,696 B1
(45) Date of Patent: Jun. 10, 2003

(54) METHOD FOR DATA REGENERATION

(75) Inventors: Jürgen Burgmeier, München (DE); Baldur Stummer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/403,715

(22) PCT Filed: Apr. 8, 1998

(86) PCT No.: PCT/DE98/01015
§ 371 (c)(1),
(2), (4) Date: Oct. 25, 1999

(87) PCT Pub. No.: WO98/49801
PCT Pub. Date: Nov. 5, 1998

(30) Foreign Application Priority Data

Apr. 25, 1997 (DE) .......................... 197 17 642

(51) Int. Cl.⁷ ............................... H03D 3/24
(52) U.S. Cl. ........................ 375/376; 375/373
(58) Field of Search ................ 375/376, 375, 375/294, 327, 373; 329/325; 327/147, 156

(56) References Cited

U.S. PATENT DOCUMENTS

| | | |
|---|---|---|
| 4,360,926 A | 11/1982 | Hedin et al. |
| 4,570,130 A * | 2/1986 | Grindel et al. .......... 331/108 D |
| 4,930,142 A * | 5/1990 | Whiting et al. ............. 331/1 A |
| 5,182,467 A | 1/1993 | Taylor et al. |

FOREIGN PATENT DOCUMENTS

| | | |
|---|---|---|
| DE | 31 22 763 C2 | 12/1982 |
| DE | 41 02 857 A1 | 8/1992 |
| EP | 0 257 625 | 3/1988 |
| JP | 7-262704 | 10/1995 |
| JP | 072 627 04 A | 10/1995 |
| SU | 509889 | 4/1976 |

OTHER PUBLICATIONS

On–Line Pseudo–Error Monitors for Digital Transmission Systems, Keelty, et al., pp. 1275–1282.
A Self Correcting Clock Recovery Circuit, Hogge, pp. 1312–1314.

* cited by examiner

*Primary Examiner*—Khai Tran
(74) *Attorney, Agent, or Firm*—Bell, Boyd & Lloyd LLC

(57) ABSTRACT

A method for data regeneration of protected data is provided wherein an error rate of a reception signal with error correcting code is identified. A sampling time and a decision threshold are provisionally varied in a predetermined range until an optimum sampling time and an optimum decision threshold are recovered by identifying the transmission error during this procedure. As a result, additional transmission errors have no influence due to the error correction.

22 Claims, 2 Drawing Sheets

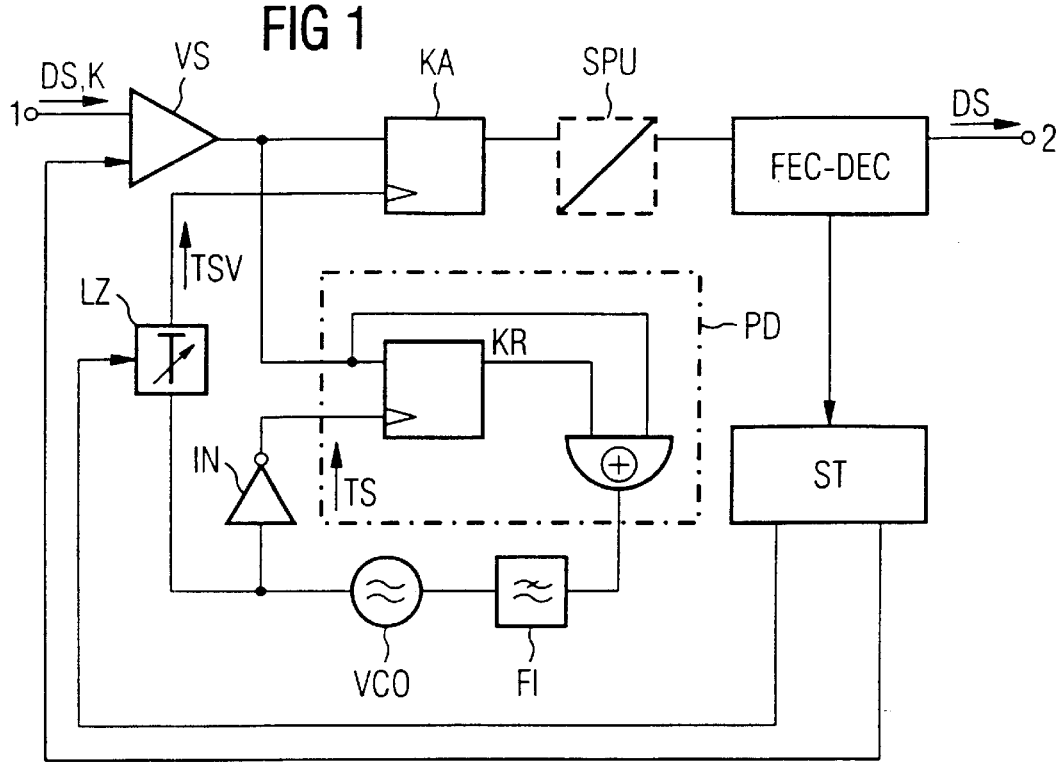
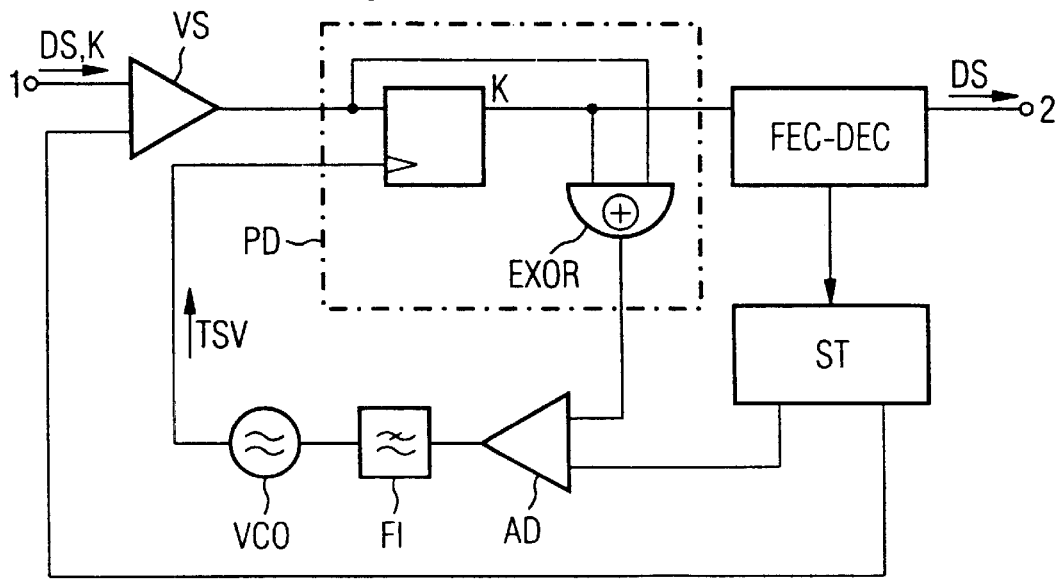

METHOD FOR DATA REGENERATION

BACKGROUND OF THE INVENTION

1. Field of the Invention

The present invention relates to a method for data regeneration of protected data wherein, based on error correction, a sampling time or a sampling threshold may be provisionally shifted without having an error-corrected output signal exhibit inadmissibly high data rates.

2. Description of the Prior Art

By comparing a sampled data signal to a data signal not yet sampled, a control criterion may be acquired that serves for the phase or/and frequency readjustment of a clock generator. Such a phase detector is described in IEEE, Journal of Lightwave Technology, Vol. LT-3, No. 6, pages 1312 through 1314. For extremely high data rates, small differences in running time caused either by tolerances or by temperature changes in the modules employed lead to the fact that signals are not sampled at an ideal point-in-time. Likewise, temperature changes can shift the sampling threshold, so that an optimum distinction between, for example, two statuses no longer may be established. Above all, however, changes in the transmission pulse shape, influences of the transmission path, pulse distortions of the reception side and asymmetrical influences on the two logical statuses transmitted prevent the definition of an optimum sampling threshold and of an optimum sampling time.

An object of the invention is to specify a method for optimum data regeneration.

This object is achieved by the method recited in claim 1.

Advantageous developments are recited in the subclaims.

The method has the great advantage that, on the basis of the error correction, it allows the sampling time or/and the sampling threshold to be shifted provisionally without having the error-corrected output signal exhibit inadmissibly high data rates.

Just like the sampling time, the sampling threshold can be varied in order to determine an optimum decision threshold.

SUMMARY OF THE INVENTION

Accordingly, in an embodiment of the present invention, a method is provided for data regeneration which includes the steps of: acquiring a control criterion for a phase locked loop from a reception signal; generating a sampling clock signal; continuously monitoring a transmission error rate to control the phase locked loop; provisionally modifying a controlled phase shift of the sampling clock signal compared to the reception signal and, thus, the sampling time; and identifying and setting an optimum sampling time based on the transmission error rates measured at different sampling times.

In an embodiment of the method, the sampling time is set.

In an embodiment of the method, the sampling time is modified only within a predetermined range.

In an embodiment of the method, the sampling time is only modified until a predetermined error rate is measured.

In an embodiment of the method, a provisionally set, new sampling time is only retained when the error rate monitored for the new setting lies below the error rate of a preceding time interval.

In an embodiment of the method, following a modification of the sampling time in only one direction, a lasting, new rated position is set when the measured error rate becomes lower.

In an embodiment of the method, the optimum sampling time is identified from the measured error rates only after a modification of the sampling time in both directions and a resetting thereof is implemented.

In an embodiment of the method, the modification of the sampling time occurs by a predetermined amount.

In an embodiment of the method, the modification of the sampling time is limited to specific time spans.

In an embodiment, the method further includes the step of employing a plurality of interleaved codes for data protection, wherein the data regeneration at a reception side occurs in different processing paths and the transmission errors are separately identified, and wherein the sampling times are modified for only one of at least two data streams.

In an embodiment of the method, the sampling times are modified with the assistance of an adjustable delay element.

In an embodiment of the method, the sampling times are modified via a correction voltage supplied to a controllable oscillator of the phase locked loop.

In a further embodiment of the present invention, a method for data regeneration is provided which includes the steps of: acquiring a control criterion for a phase locked loop from an encoded reception signal; generating a sampling clock signal; continuously monitoring a transmission error rate to control the phase locked loop; provisionally modifying a decision threshold for the reception signal; and identifying and setting an optimum decision threshold based on the transmission error rates given different decision thresholds.

In an embodiment of the method, the decision threshold is set.

In an embodiment of the method, the decision threshold is modified only within a predetermined range.

In an embodiment of the method, the decision threshold is only modified until a predetermined error rate is measured.

In an embodiment of the method, a provisionally set, new decision threshold is retained only when the error rate identified for a new setting lies below the error rate of a preceding time interval.

In an embodiment of the method, following a modification of the decision threshold in only one direction, a lasting, new rated position is set when the measured error rate becomes lower.

In an embodiment of the method, the optimum decision threshold is identified from the measured error rates only after a modification of the decision threshold in both directions and a resetting thereof is implemented.

In an embodiment of the method, the modification of the decision threshold occurs by a predetermined amount.

In an embodiment of the method, the modification of the decision threshold is limited to specific time spans.

In an embodiment, the method further includes the step of employing a plurality of interleaved codes for data protection, wherein the data regeneration at a reception side occurs in different processing paths and the transmission error rates are separately identified, and wherein the decision threshold is modified for only one of at least two data streams.

When the identified error rate of the new sampling time set provisionally lies above the error rate of the preceding sampling time, the previously employed sampling time (or the previously employed sampling threshold) is initially retained and a shift of the sampling time in the other direction is provisionally implemented in order to identify the optimum sampling time.

It is also advantageous that the sampling time and the sampling threshold be adjusted only within a predetermined range. What is thereby assured is that the data regeneration still works even upon a malfunction of the control. Given interleaved error-correcting codes, the monitoring and readjustment of sampling time and sampling threshold can occur in different data paths, each of which are individually optimized. This parallel processing is also required for technological reasons given high data rates. The other data path can serve as comparison criterion. The ranges wherein the sampling time and the sampling threshold move can be determined from the previously measured error rate and from the error rate occurring during the change.

It is also meaningful that, given a newly formed connection, the ranges for readjustment of sampling time and sampling threshold, as well as the change rate, are initially selected greater than given a connection which already exists. It is advantageous in this method that no second data path need be provided, this serving only for determining the optimum sampling time and the optimum sampling threshold that are then transmitted on the actual data path. In this method, an optimum setting and data regeneration no longer can be achieved due to tolerances in the various data paths.

Additional features and advantages of the present invention are described in, and will be apparent from, the Detailed Description of the Preferred Embodiments and the Drawing.

DESCRIPTION OF THE DRAWING

FIG. 1 shows a schematic circuit diagram associated with the method of the present invention.

FIG. 2 shows an alternative configuration of a schematic circuit digram associated with the method of the present invention.

DETAILED DESCRIPTION OF THE PREFFERED EMBODIMENTS

Figure 3:
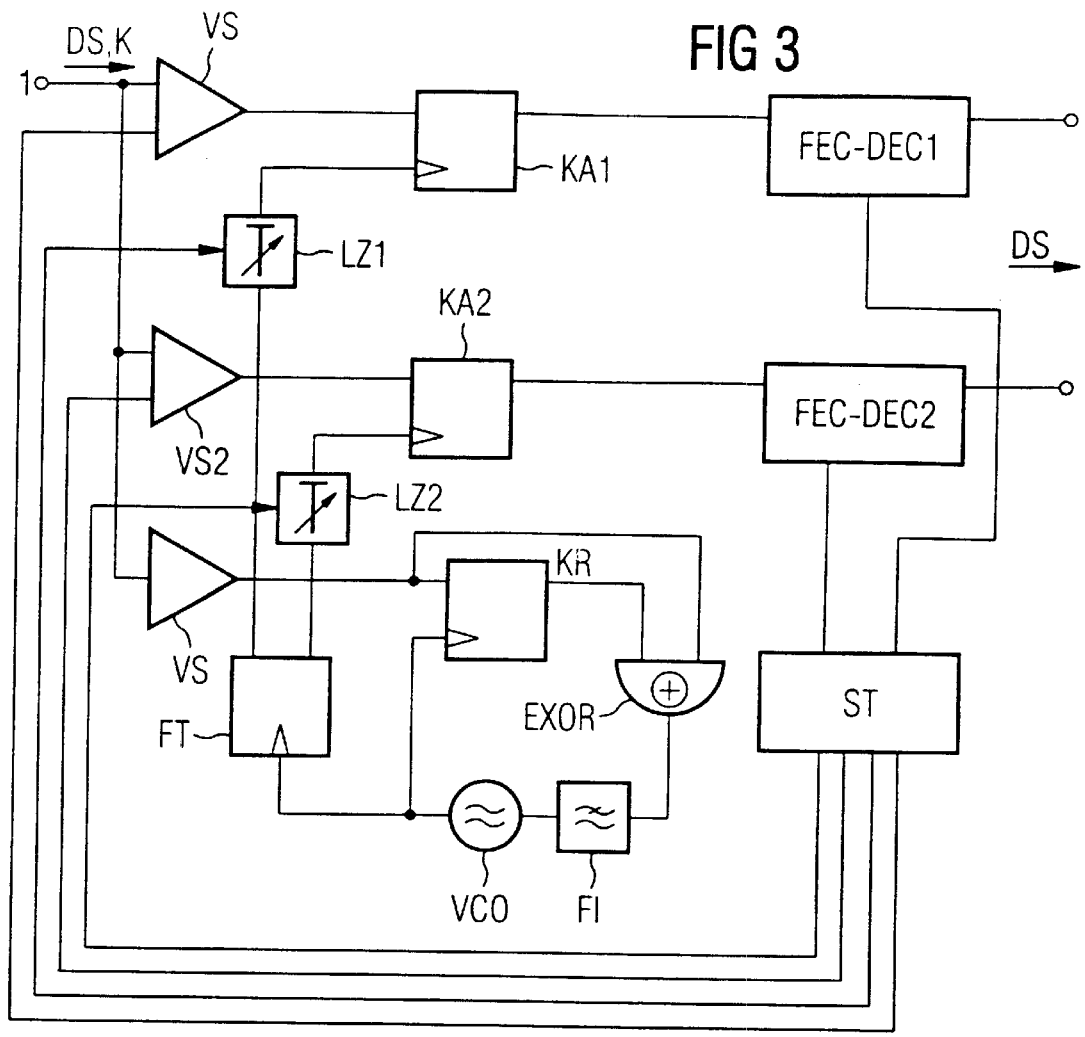
FIG. 3 shows another alternative configuration with separately protected data streams.

FIG. 1 shows a schematic circuit diagram for implementing the method of the present invention. The transmitted data signal DS, including the check bits K serving the purpose of error correction, is supplied to a data input 1 of a decision stage ES. The output thereof is connected to a phase detector PD that contains an exclusive -OR gate EXOR for acquiring a control voltage that controls an oscillator VCO via a filter FI. This outputs a clock signal TS that, for sampling the received data signal DS, K triggers a regenerator sampling trigger circuit KR conducted via an inverter IN or a delay element. The same clock signal TS is supplied via an adjustment delay element LZ and, as adjustable sampling signal TSV, triggers a sampling trigger circuit KA that outputs the sampled data signal DS, K at its data output for further processing. The data signal DS-K is supplied to an FEC decoder that implements an error recognition and/or error correction on the basis of the check bits and outputs the corrected data signal DS at the data output 2. Given both high data rates and interleaved coding, a serial-to-parallel converter can be inserted between the output of the sampling trigger circuit KA1 and the FEC decoder.

A control checks the transmission error rate at predetermined time intervals on the basis of the correction frequency and, potentially, with an additional error recognition. These time intervals can correspond to a plurality of data blocks.

In order to set an optimum sampling time, the control provisionally modifies the running time of the variable delay element LZ. The modification of the running time corresponds to a shift of the sampling time $T_A$, which is only allowed to occur within a certain range BE. The deriving error rate can be employed as further limit, this always having to lie considerably below the error correctability of the code employed, but also being potentially dependent on the most recently measured error rate.

The shift of the sampling time initially occur in one direction. The error rate is measured at the same time. When the error rate is reduced, the sampling time is shifted. This can occur by a fixed value; for example, in that the provisionally implemented shift has lead to the new rated sampling time. When, by contrast, the error rate becomes higher, a provisional shift occurs in the other direction, which first be preceded by a further measurement in the previous rated position.

However, provisional shifts in both directions relative to the last rated sampling time also be initially undertaken. The new sampling time is determined on the basis of the measurements wherein the error rate is a minimum thereat. When a higher error rate than given the earlier sampling time is to be anticipated given the new sampling time, no re-adjustment is implemented; rather, the error rate is initially measured again in order to determine whether the transmission path has, potentially, become poorer.

The setting of the sampling time also can occur in very small, constant steps; i.e., independent of the size of the identified deviation. A local minimum of the error rate must be avoided. At specific times or given newly connected connections, one can therefore initially begin with larger provisional adjustments.

The control should include a low-pass function that only effects a final shift of the sampling time after a considerable number of data blocks, when the newly identified sampling time is sure to lead to better error rates. The number of setting events, also can be limited to specific times.

The sampling threshold can be set according to the same mode in that the comparison voltage $U_{AB}$ of the comparison stage VS is varied. The combination of the two measures effects an optimum regeneration of the received data signal.

Figure 4:
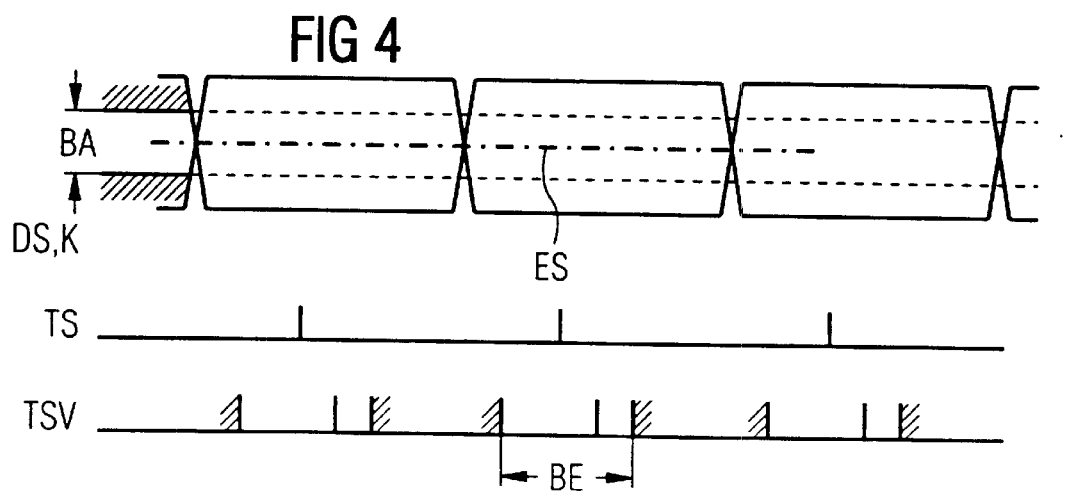
FIG. 4 shows a time diagram associated with the method of the present invention.

The range BE in which a shift of the sampling time occurs and the range BA in which a shift of the decision threshold ES occurs can be limited such that the error rate of the corrected data signal remains low as a result of the search events, as shown in FIG. 4.

A delay element need not be employed for shifting the sampling time. As shown in FIG. 2, the output of the comparison stage VS is directly connected to the input of the phase detector, to whose output the FEC decoder FEC-DEC is connected. The control ST influences the input of the controlled oscillator VCO here via an adder AD. The clock signal is shifted relative to the data signal due to the control criterion SK superimposed on the control signal RE. Separate comparison stages also can be employed for the sampling trigger circuit KA and the regenerator trigger circuit KR.

In FIG. 3, a data signal DS, secured by error-correcting codes interleaved with one another, and the respectively appertaining check bits K are divided into two data streams. Two decision units VS1 and VS2 are provided, each being followed by a sampling trigger circuit KA1 or, respectively, KA2. The trigger circuits are driven with clocks TS1 or, respectively, TS2 that are acquired by frequency division from the clock signal TS. Each data stream DS1, DS2 is supplied to a separate FEC decoder FEC-DEC1 or, respectively, FEC-DEC2.

Both sampling clocks can be controlled via different delay elements LZ1 and LZ2. The control varies the sampling time and the sampling threshold for, respectively, only one data path and implements an individual optimization. There is the possibility of comparing the result not only to the preceding measured results but also to the measured results of the other data stream. Modified transmission conditions can, thus, be taken into consideration faster.

Although the present invention has been described with reference to specific embodiments, those of skill in the art will recognize that changes may be made thereto without departing from the spirit and scope of the invention as set forth in the hereafter appended claims.

What is claimed is:

1. A method for data regeneration, comprising the steps of:
    acquiring a control criterion for a phase locked loop from a reception signal with error correcting code;
    generating a sampling clock signal;
    continuously monitoring a transmission error rate to control the phase locked loop;
    provisionally modifying a controlled phase shift of the sampling clock signal compared to the reception signal with error correcting code and, thus, modifying a sampling time; and
    identifying and setting an optimum sampling time based on the transmission error rates measured at different sampling times.

2. A method for data regeneration as claimed in claim 1, wherein the sampling time is set.

3. A method for data regeneration as claimed in claim 1, wherein the sampling time is modified only within a predetermined range.

4. A method for data regeneration as claimed in claim 1, wherein the sampling time is only modified until a predetermined error rate is measured.

5. A method for data regeneration as claimed in claim 1, wherein a provisionally set, new sampling time is only retained when the error rate monitored for the new setting lies below the error rate of a preceding time interval.

6. A method for data regeneration as claimed in claim 1, wherein, following a modification of the sampling time in only one direction, a lasting, new rated position is set when the measured error rate becomes lower.

7. A method for data regeneration as claimed in claim 1, wherein the optimum sampling time is identified from the measured error rates only after a modification of the sampling time in both directions and a resetting thereof is implemented.

8. A method for data regeneration as claimed in claim 1, wherein the modification of the sampling time occurs by a predetermined amount.

9. A method for data regeneration as claimed in claim 1, wherein the modification of the sampling time is limited to specific time spans.

10. A method for data regeneration as claimed in claim 1, further comprising the step of:
    employing a plurality of interleaved codes for data protection, wherein data regeneration at a reception side occurs in different processing paths and the transmission errors are separately identified, and wherein the sampling times are modified for only one of at least two data streams.

11. A method for data regeneration as claimed in claim 1, wherein the sampling times are modified with the assistance of an adjustable delay element.

12. A method for data regeneration as claimed in claim 1, wherein the sampling times are modified via a correction voltage supplied to a controllable oscillator of the phase locked loop.

13. A method for data regeneration, comprising the steps of:
    acquiring a control criterion for a phase locked loop from a reception signal with error correcting code;
    generating a sampling clock signal;
    continuously monitoring a transmission error rate to control the phase locked loop;
    provisionally modifying a decision threshold for the reception signal with error correcting code; and
    identifying and setting an optimum decision threshold based on the transmission error rates given different decision thresholds.

14. A method for data regeneration as claimed in claim 13, wherein the decision threshold is set.

15. A method for data regeneration as claimed in claim 13, wherein the decision threshold is modified only within a predetermined range.

16. A method for data regeneration as claimed in claim 13, wherein the decision threshold is only modified until a predetermined error rate is measured.

17. A method for data regeneration as claimed in claim 13, wherein a provisionally set, new decision threshold is retained only when the error rate identified for a new setting lies below the error rate of a preceding time interval.

18. A method for data regeneration as claimed in claim 13, wherein, following a modification of the decision threshold in only one direction, a lasting, new rated position is set when the measured error rate becomes lower.

19. A method for data regeneration as claimed in claim 13, wherein the optimum decision threshold is identified from the measured error rates only after a modification of the decision threshold in both directions and a resetting thereof is implemented.

20. A method for data regeneration as claimed in claim 13, wherein the modification of the decision threshold occurs by a predetermined amount.

21. A method for data regeneration as claimed in claim 13, wherein the modification of the decision threshold is limited to specific time spans.

22. A method for data regeneration as claimed in claim 13, further comprising the step of:
    employing a plurality of interleaved codes for data protection, wherein data regeneration at a reception side occurs in different processing paths and the transmission errors are separately identified, and wherein the decision threshold is modified for only one of at least two data streams.

* * * * *